(12) United States Patent
Cho et al.

(10) Patent No.: US 9,450,630 B2
(45) Date of Patent: Sep. 20, 2016

(54) METHODS AND DEVICES FOR DISPLAYING MULTIPLE SUBSCRIBER IDENTITY MODULE CARD SLOTS INFORMATION

(71) Applicant: MediaTek Inc., Hsin-Chu (TW)

(72) Inventors: Te-Chung Cho, Taichung (TW); Yu-Ting Chen, Chiayi County (TW); Che-Cheng Lin, Taipei (TW); Jen-De Lai, New Taipei (TW); Tao-Sheng Ou, Taoyuan County (TW); Tsung-Te Wang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/291,490

(22) Filed: May 30, 2014

(65) Prior Publication Data

US 2015/0349824 A1    Dec. 3, 2015

(51) Int. Cl.
*H04B 1/38*    (2015.01)
*H04B 1/3816*    (2015.01)
*H04M 1/725*    (2006.01)

(52) U.S. Cl.
CPC ....... *H04B 1/3816* (2013.01); *H04M 1/72519* (2013.01); *H04M 1/72569* (2013.01); *H04M 2250/66* (2013.01)

(58) Field of Classification Search
CPC .......... H04B 1/3816; H04M 2250/14; H04M 1/72519
USPC .................................................. 455/558, 566
See application file for complete search history.

(56) References Cited

U.S. PATENT DOCUMENTS

| | | | |
|---|---|---|---|
| 8,983,441 B2 * | 3/2015 | Baek ............................. | 455/417 |
| 2008/0014990 A1 * | 1/2008 | Jain et al. ..................... | 455/558 |
| 2008/0102894 A1 * | 5/2008 | Ban et al. ...................... | 455/558 |
| 2009/0029736 A1 * | 1/2009 | Kim et al. ..................... | 455/558 |
| 2009/0061934 A1 * | 3/2009 | Hauck et al. ................. | 455/558 |
| 2009/0104939 A1 * | 4/2009 | Lee ................................ | 455/558 |
| 2012/0108294 A1 * | 5/2012 | Kaul .............................. | 455/558 |
| 2014/0179373 A1 * | 6/2014 | Hur et al. ..................... | 455/558 |
| 2014/0200048 A1 * | 7/2014 | Cheng .......................... | 455/558 |
| 2014/0335825 A1 * | 11/2014 | Babbage et al. ............. | 455/411 |
| 2014/0342779 A1 * | 11/2014 | Yu et al. ....................... | 455/558 |
| 2015/0018040 A1 * | 1/2015 | He et al. ....................... | 455/558 |
| 2015/0189496 A1 * | 7/2015 | Park et al. .................... | 455/558 |

* cited by examiner

*Primary Examiner* — Simon Nguyen
(74) *Attorney, Agent, or Firm* — McClure, Qualey & Rodack, LLP

(57) ABSTRACT

A method for displaying SIM card slot information for use in a device including M SIM card slots, each of which may have a SIM card inserted therein or no SIM card inserted therein. The method includes the following steps. A set of predetermined rules are first determined by the device. Statuses of the M SIM card slots corresponding to the set of predetermined rules are then acquired. Information regarding N of the M SIM card slots are displayed on a display unit of the device according to the set of predetermined rules determined by the current associated network and the acquired statuses of the M SIM card slots, where N<M and N>=1.

19 Claims, 9 Drawing Sheets

METHODS AND DEVICES FOR DISPLAYING MULTIPLE SUBSCRIBER IDENTITY MODULE CARD SLOTS INFORMATION

BACKGROUND OF THE INVENTION

1. Field of the Invention

The invention relates to subscriber identity module (SIM) card slot information displaying, and more precisely, to methods for dynamically displaying SIM card slot information for use in a device including multiple SIM card slots based on a set of predetermined rules and corresponding statuses of the SIM card slots.

2. Description of the Related Art

Recently, portable devices, such as mobile or handheld devices, have become more and more technically advanced and multifunctional. For example, a mobile device may receive email messages, have an advanced address book management application, allow for media playback, and have various other functions. Because of the conveniences of portable devices with multiple functions, the devices have become necessities of life. As technology advances, mobile devices adapted for multiple subscriber numbers, dual-card or multiple-card have been developed, which generally have two or more wireless communication modules for respectively performing wireless transmission and reception with an individual subscriber number, are now becoming available to end users. For example, a Dual SIM Dual Standby (DSDS) device comprises means for receiving/sending messages associated with at least two subscriber identity modules (SIMs). The at least two SIMs may be associated with the same or different cellular networks, and may be using the same or different Radio Access Technologies (RAT), such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Universal Mobile Telecommunications System (UMTS) technology, short range wireless technology such as WLAN (e.g., WiFi) technology, Bluetooth technology, and others.

Currently, portable devices with multiple SIM card slots show information or statuses of all of the SIM card slots. As the number of SIM cards in the portable device increases, the number of the standby networks associated with the SIM cards also increases, thus causing the display screen become crowded and mess and making other information can't be displayed properly. Moreover, the user may be hard to read the information of a specific SIM card slot when the number of the SIM card slots increases, dramatically reducing user satisfaction.

BRIEF SUMMARY OF THE INVENTION

An embodiment of the invention also provides a method for displaying SIM card slot information for use in a device is provided, wherein the device includes M SIM card slots, each of which may have a SIM card inserted therein or no SIM card inserted therein. The method comprises the following steps. A set of predetermined rules are first determined. Statuses of the M SIM card slots corresponding to the set of predetermined rules are then acquired. Information regarding N of the M SIM card slots are displayed on a display unit of the device according to the set of predetermined rules determined by the current associated network and the acquired statuses of the M SIM card slots, where N<M and N>=1.

Another embodiment of the invention also provides a method for displaying SIM card slot information for use in a device is provided, wherein the device includes M SIM card slots. The method comprises the following steps. A set of user settings pre-stored in a memory unit of the device is first acquired. Statuses of the M SIM card slots corresponding to the set of user settings are then acquired. Information regarding N of the M SIM card slots are displayed on a display unit of the device according to the set of user settings and the acquired statuses of the M SIM card slots, where N<M and N>=1.

Another embodiment of the invention provides a device. The device includes a storage device, M SIM card slots, a processing unit and a display unit. The storage device stores a set of user settings. The processing unit determines a set of predetermined rules and acquires statuses of the M SIM card slots corresponding to the set of predetermined rules. The processing unit further determines N SIM card slots of the M SIM card slots to be displayed according to the set of predetermined rules determined and the acquired statuses of the M SIM card slots, where N<M and N>=1. The display unit displays information regarding the determined N SIM card slots.

Yet another embodiment of the invention provides a device. The device includes a storage device, M SIM card slots, a processing unit and a display unit. The storage device stores a set of user settings. The processing unit acquires the set of user settings pre-stored in the storage device and acquires statuses of the M SIM card slots corresponding to the set of user settings, and determines N SIM card slots of the M SIM card slots to be displayed according to the set of user settings and the acquired statuses of the M SIM card slots, where N<M and N>=1. The display unit displays information regarding the determined N SIM card slots according to the set of user settings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The embodiments of the invention provide methods for displaying SIM card slot information for use in a device including M SIM card slots so as to dynamically determine which SIM card slot to be displayed and update the display of information of the determined SIM card slots based on a set of predetermined rules determined by the device or a set of user settings predefined by a user. Therefore, only information of partial of the M SIM card slots in which the status thereof does not satisfy the set of predetermined rules will be shown on the display unit of the device, preventing useless or unwanted information of the unnecessary SIM card slots from being displayed. In some embodiments, the invention can also be provided a user interface for a user to configure the set of the predetermined rules, the set of user settings and a display order of the displayed SIM card slots, allowing the user to determine which SIM card slot should be displayed flexibly.

Figure 1:
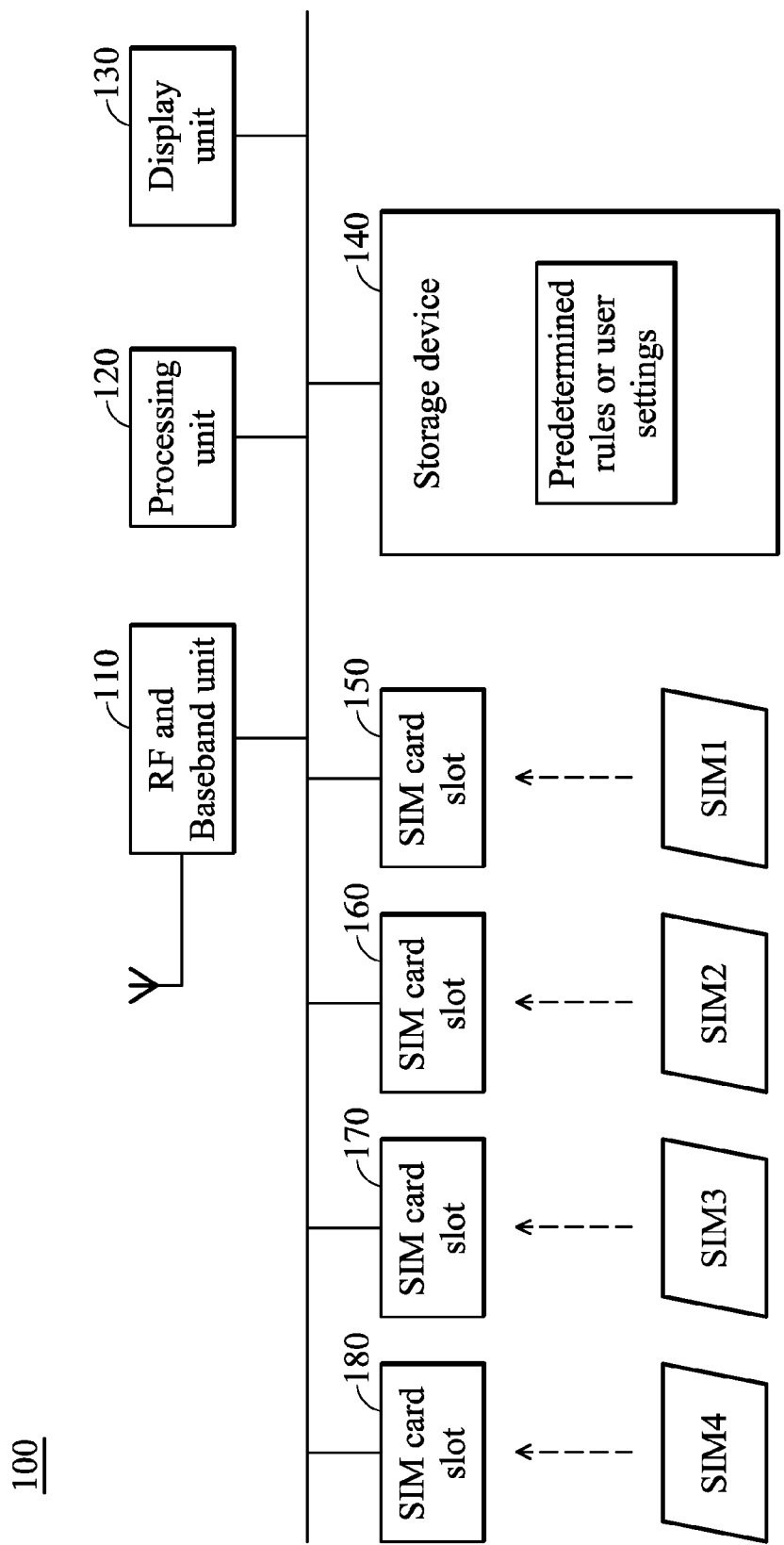
FIG. 1 is a schematic diagram illustrating an embodiment of a device 100 according to the invention.

FIG. 1 is a schematic diagram illustrating an embodiment of a device 100 according to the invention. The device 100 may be a portable device, such as a mobile phone, a smart phone, or a PDA. The device 100 comprises a radio frequency (RF) and baseband unit 110, a processing unit 120, a display unit 130 and a storage device 140. The RF and baseband unit 110 receives signals from and transmits signals to a current associated network. It is to be understood that integrating the processing unit 120 into the RF and baseband unit 110 is also available. The processing unit 120 performs methods for displaying SIM card slot information for use in a device including M SIM card slots based on a set of predetermined rules determined by the device or a set of user settings predefined by a user. The display unit 130 displays information regarding information of the M SIM card slots. For example, the information of each SIM card slot being displayed may comprise information indicating strength of the signal received from a network associated with the SIM card inserted therein, such as the received signal strength indication (RSSI) value, but the invention is not limited thereto.

The storage device 140 may be a volatile or non-volatile storage device, such as a memory unit. The storage device 140 may store a set of predetermined rules or a set of user settings which are display rules for determining which SIM slot information should be shown determined by the device. The set of predetermined rules stores information regarding display rules for determining which SIM slot information should be shown determined by the device. The display rules may indicate that information of which SIM slot should be hidden or be shown. In some embodiments, the set of predetermined rules may comprise, for example but not limited to, one or more of the following rules: hiding information of a SIM card slot in which an invalid SIM card is inserted; hiding information of a SIM card slot in which the inserted SIM card is deactivated; hiding information of a SIM card slot in which the inserted SIM card is in a no service status; and hiding information of a SIM card slot in which the inserted SIM card is in a roaming status. A user may configure the set of user setting by a user interface (e.g. FIGS. 7A-7B) provided by the device. Additional details on the set of predetermined rules and configuration of the set of user settings will be described below.

The device 100 may also include M SIM card slots, wherein each SIM card slot is configured to receive a SIM card. When some of SIM cards are received or inserted in the SIM card slots, the inserted SIM cards may be associated with the same or different cellular networks, and may be using the same or different aforementioned RATs. For illustration, as shown in FIG. 1, the device 100 includes four SIM card slots 150, 160, 170 and 180 and four SIM cards SIM1, SIM2, SIM3 and SIM4 can be inserted therein, respectively. Note further that in some embodiments of the invention, the device 100 may further be extended to comprise more than four SIMs, and the invention should not be limited what is shown in FIG. 1.

In some embodiments, the statuses of the M SIM card slots may comprise information indicating, for example but not limited to, one or more of the following statues for each SIM card slot: whether an invalid SIM card is inserted; whether the inserted SIM card is deactivated; whether the inserted SIM card is in a no service status; and whether the inserted SIM card is in a roaming status. The status of a first SIM card slot is indicated as valid if the inserted SIM card is valid and it is indicated as invalid if the inserted SIM card is invalid. The status of the first SIM card slot is indicated as activated if the inserted SIM card is activated and it is indicated as deactivated if the inserted SIM card is deactivated. The status of the first SIM card slot is indicated as in service if the inserted SIM card is in service status and it is indicated as no service if the inserted SIM card is in the no service status. The status of the first SIM card slot is indicated as not in the roaming status if the inserted SIM card is not in the roaming status and it is indicated as in the roaming status if the inserted SIM card is in the roaming status.

To be more specific, the processing unit 120 may determine N SIM card slots of the M SIM card slots to be displayed according to the set of predetermined rules determined by the device or by the user and acquired statuses of the M SIM card slots corresponding to the set of predetermined rules, where N<M and N>=1. The display unit 130 may then display information regarding the determined N SIM card slots, such as RSSI for each SIM slot.

Several embodiments of methods for displaying SIM card slot information among M SIM card slots based on a set of predetermined rules determined by the device or a set of user settings predefined by a user and corresponding statuses of the M SIM card slot are provided.

In some embodiments, the SIM card slot information can be displayed based on a set of predetermined rules determined by the device and corresponding statuses of the M SIM card slots.

Figure 2:
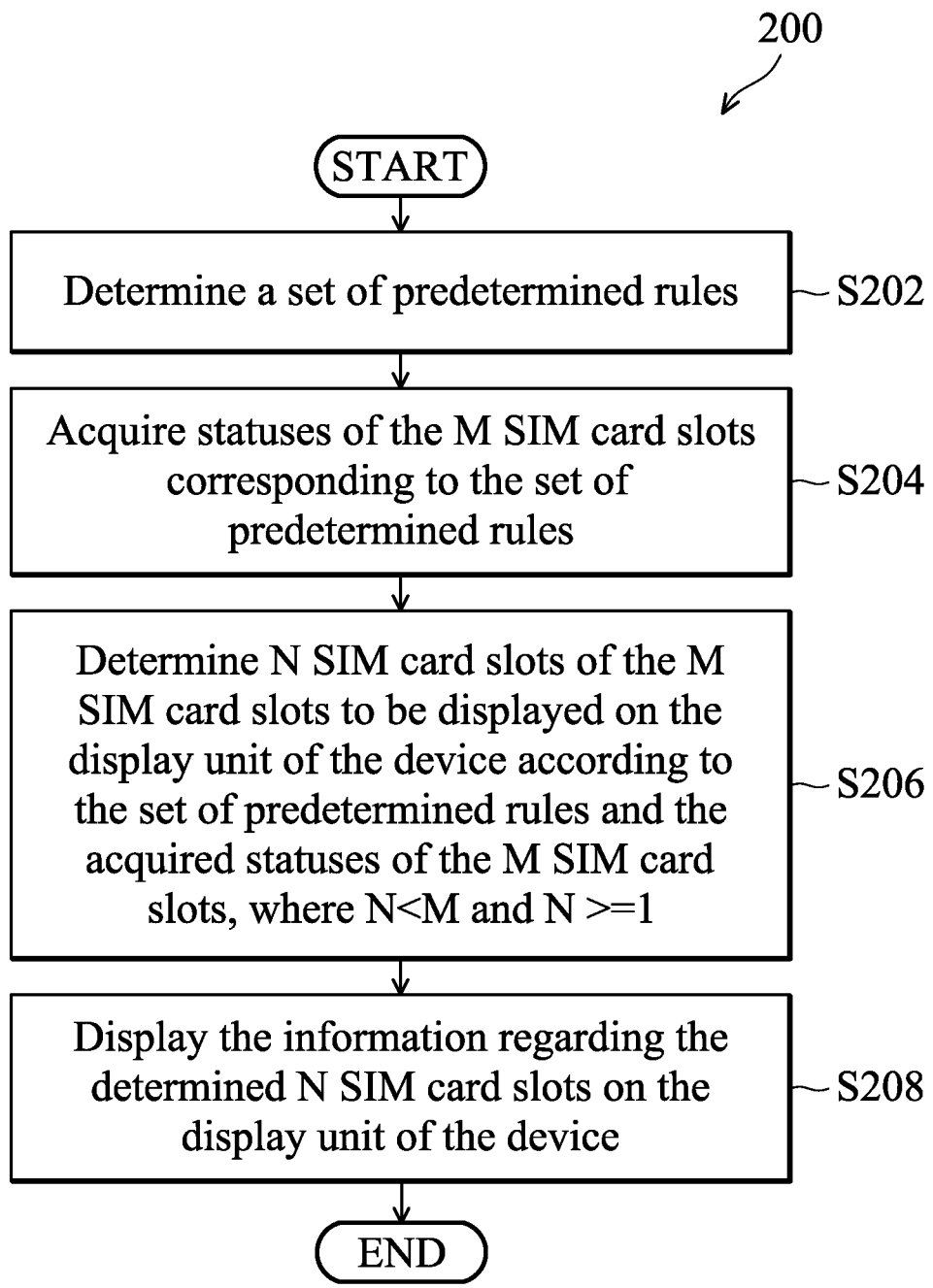
FIG. 2 is a flowchart showing an embodiment of a method for displaying SIM card slot information for use in a device according to the invention.

FIG. 2 is a flowchart 200 showing an embodiment of a method for displaying SIM card slot information for use in a device according to the invention. In this embodiment, the device (e.g. the device 100 of FIG. 1) includes M SIM card slots, each of which may have a SIM card inserted therein or no SIM card inserted therein.

In step S202, the processing unit 120 of the device 100 determines a set of predetermined rules. In some embodiments, the set of predetermined rules may comprise, for example but not limited to, one or more of the following rules: hiding information of a SIM card slot in which an invalid SIM card is inserted; hiding information of a SIM card slot in which the inserted SIM card is deactivated; hiding information of a SIM card slot in which the inserted SIM card is in a no service status; and hiding information of a SIM card slot in which the inserted SIM card is in a roaming status.

Then, in step S204, the processing unit 120 acquires statuses of the M SIM card slots corresponding to the set of predetermined rules. In some embodiments, the statuses of the M SIM card slots may comprise information indicating, for example but not limited to, one or more of the following statuses for each SIM card slot: whether an invalid SIM card is inserted; whether the inserted SIM card is deactivated; whether the inserted SIM card is in a no service status; and whether the inserted SIM card is in a roaming status. The processing unit 120 may acquire the aforementioned statuses of all of the M SIM card slots according to the set of predetermined rules.

After the statuses of all of the M SIM card slots are acquired, in step S206, the processing unit 120 determines N SIM card slots of the M SIM card slots to be displayed on the display unit of the device according to the set of predetermined rules determined by the device and the acquired statuses of the M SIM card slots, where N<M and N>=1. For example, if M is 4, N can be 1, 2 or 3. After the N SIM card slots to be displayed are determined, in step S208, the display unit 130 displays the information regarding the determined N SIM card slots.

Determination of the N SIM card slots of the M SIM card slots to be displayed on the display unit of the device according to the set of predetermined rules determined by the current associated network and the acquired statuses of the M SIM card slots can be achieved by determining whether the status of a first SIM card slot of the M SIM card slots satisfies the set of predetermined rules. It is to be noted that the first SIM card slot used herein can be any of the M SIM card slots and thus the following steps can be applied to each of the M SIM card slots. The processing unit 120 may determine to display the information of the first SIM card slot when determining that the status of the first SIM card slot does not satisfy any of the set of predetermined rules and it may determine not to display the information of the SIM card slot when determining that the status of the first SIM card slot satisfies one of the set of predetermined rules.

To be more specific, in some embodiments, the display unit 130 may display the information of the first SIM card slot in which the status thereof indicates that the inserted SIM card is valid when the set of predetermined rules only comprise hiding information of the SIM card slot in which the invalid SIM card is inserted; the display unit 130 may display the information of the first SIM card slot in which the status thereof indicates that the inserted SIM card is activated when the set of predetermined rules only comprise hiding information of the SIM card slot in which the inserted SIM card is deactivated; the display unit 130 may display the information of the first SIM card slot in which the status thereof indicates that the inserted SIM card is in service when the set of predetermined rules only comprise hiding information of the SIM card slot in which the inserted SIM card is in the no service status; and the display unit 130 may display the information of the first SIM card slot in which the status thereof indicates that the inserted SIM card is not in the roaming status when the set of predetermined rules only comprise hiding information of the SIM card slot in which the inserted SIM card is in the roaming status.

Figure 6A:
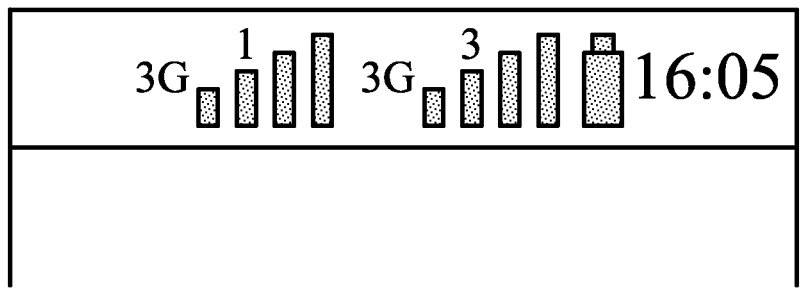
FIGS. 6A and 6B show exemplary displays of the information of the SIM card slots according to the invention.

FIG. 6A shows an exemplary display of the information of the SIM card slots according to the invention. In this embodiment, it is assumed that the processing unit 120 determines the set of predetermined rules to comprise the following rules: hiding information of a SIM card slot in which the inserted SIM card is deactivated and hiding information of a SIM card slot in which the inserted SIM card is in a roaming status. For a device with four SIM card slots with four SIM cards SIM1, SIM2, SIM3 and SIM4 in which the acquired statuses for the four SIM card slots indicate that SIM1 is in use or valid, SIM2 is deactivated, SIM3 is not in the roaming status and SIM4 is in the roaming status, only the information of the SIM1 and SIM3 will be displayed while the information of the SIM2 and SIM4 will not be displayed as shown in FIG. 6A.

Figure 3:
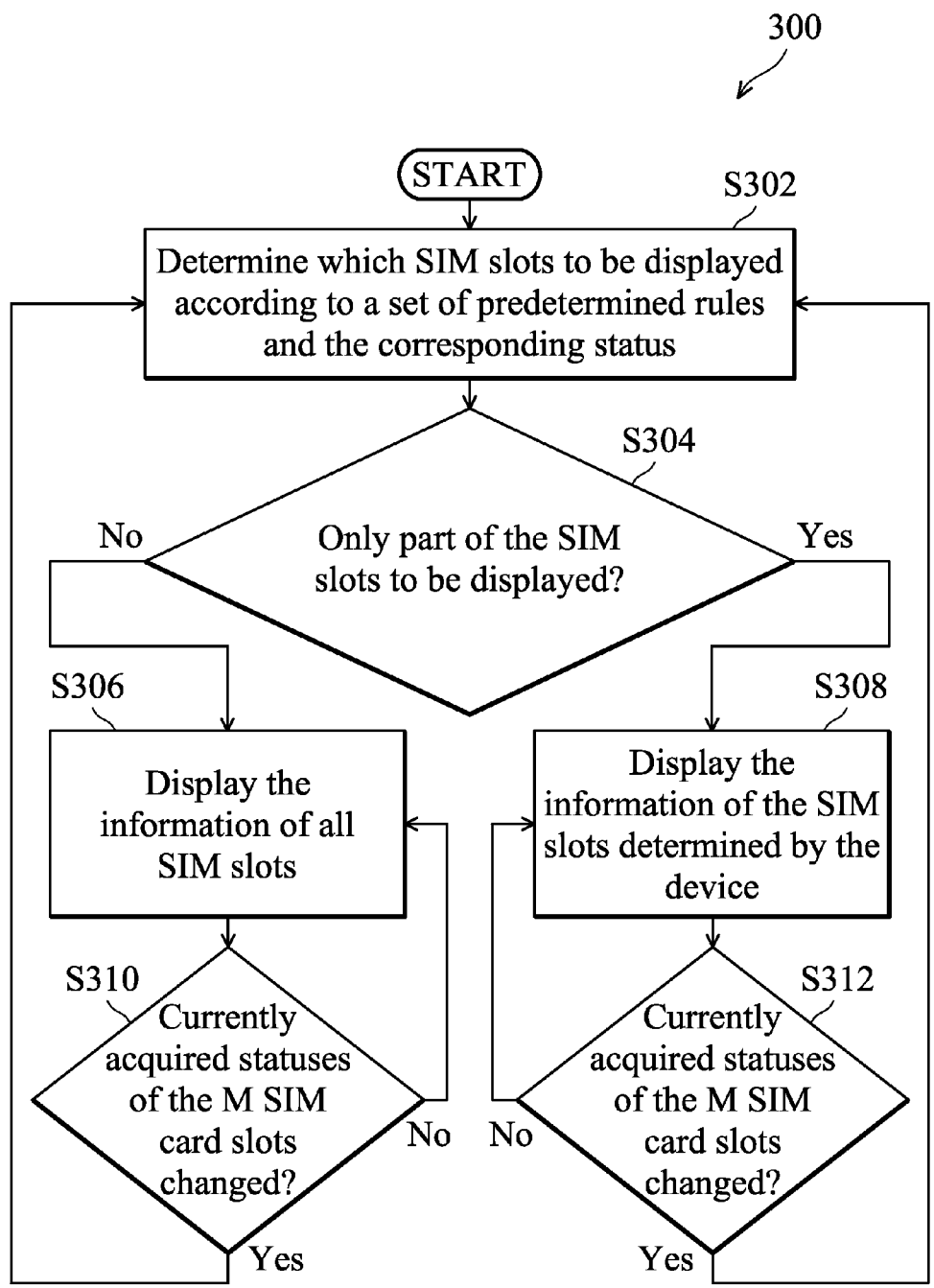
FIG. 3 is a flowchart showing another embodiment of a method for displaying SIM card slot information according to the invention.

FIG. 3 is a flowchart 300 showing another embodiment of a method for displaying SIM card slot information according to the invention. In this embodiment, the device (e.g. the device 100 of FIG. 1) includes M SIM card slots, each of which may have a SIM card inserted therein or no SIM card inserted therein.

In step S302, the processing unit 120 determines N SIM card slots to be displayed according to a set of predetermined rules and the corresponding status of the M SIM card slots. The set of predetermined rules can comprise one or more of aforementioned rules and the corresponding status of the M SIM card slots can comprise one or more of aforementioned statuses. Next, in step S304, the processing unit 120 further determines whether only part of the M SIM slots are to be displayed. If not, i.e. N=M, in step S306, the processing unit 120 displays the information of all of the M SIM slots on the display unit 130 and step S310 is further performed. Otherwise (Yes in step S304), i.e. N<M, in step S308, the processing unit 120 displays only the information of the determined N SIM slots on the display unit 130 and step S312 is further performed. In step S310 or step S312, the processing unit 120 further determines whether currently acquired statuses of the M SIM card slots have been changed and if so, returns to step S302 to re-determine the N SIM slots to be displayed so as to refresh or update the displayed information of the N SIM card slots on the display unit 130 based on currently acquired statuses of the M SIM card slots and the set of predetermined rules if needed.

Figure 7A:
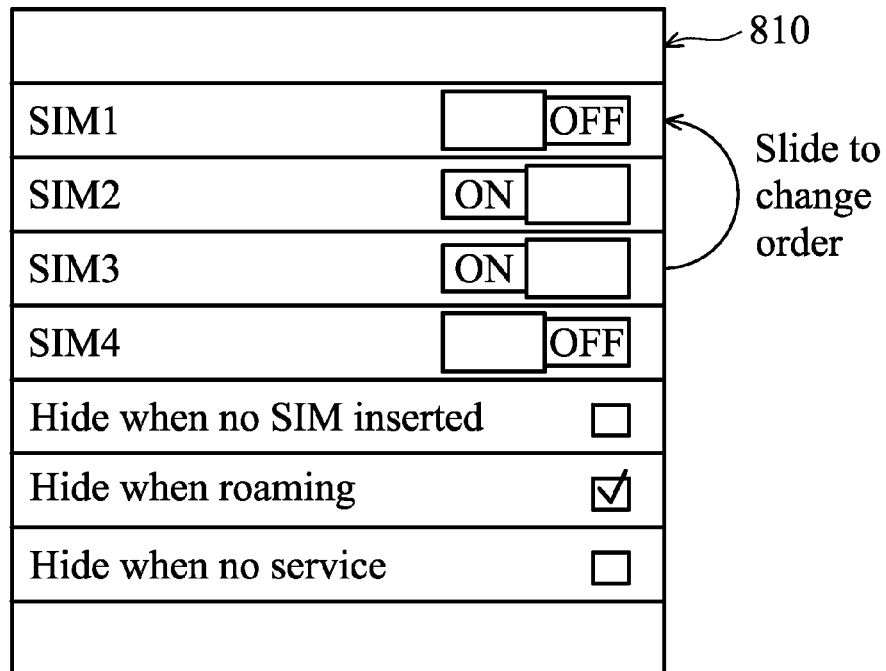
FIGS. 7A to 7B and 8A to 8B show some exemplary user interfaces for configuring the set of user settings according to the invention.
Figure 7B:
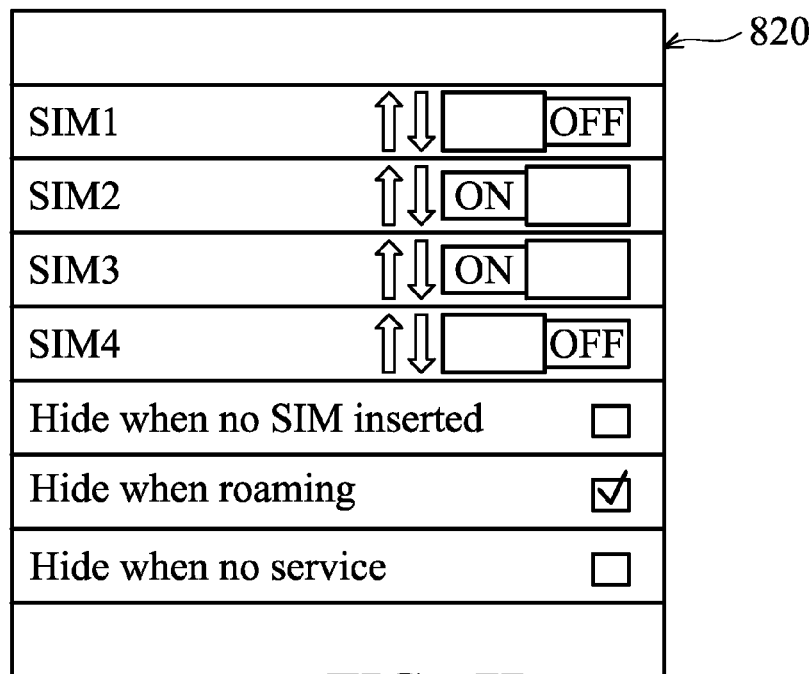
Figure 8A:
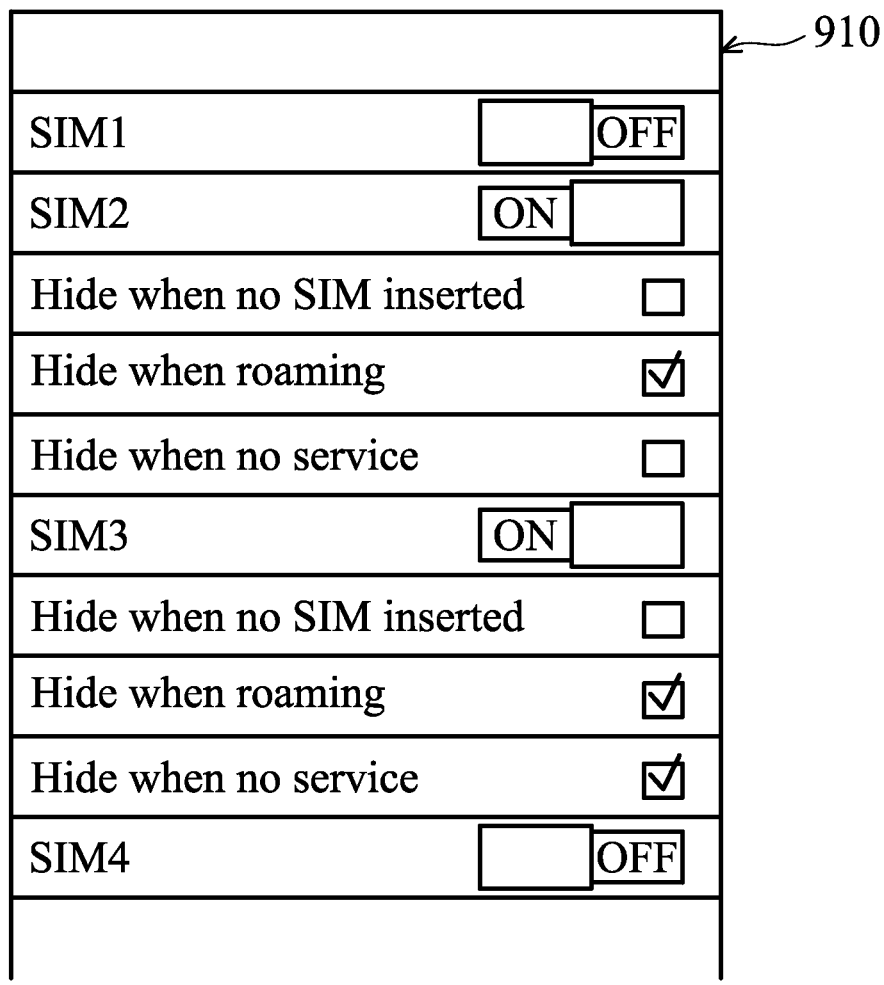
Figure 8B:
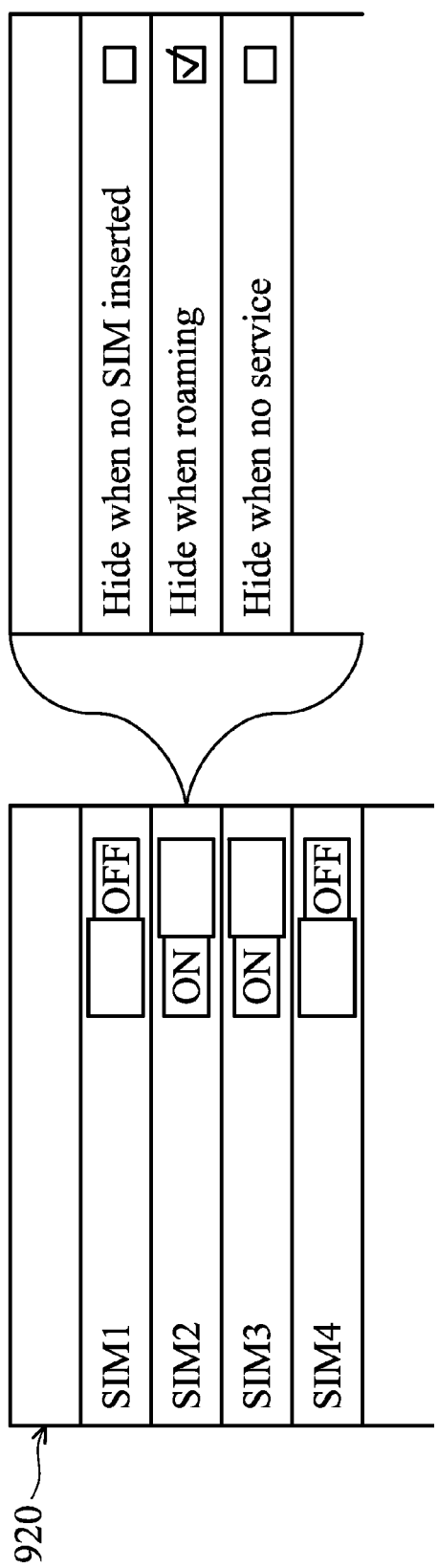

In some embodiments, a user may configure a set of user settings by a user interface provided by the device and store them to the storage device 140 and the SIM card slot information can be displayed based on the set of user settings predefined by the user and corresponding statuses of the M SIM card slots. A user interface is provided for the user to configure the set of the predetermined rules, the display order and the set of user settings. The set of user settings may comprise information indicating which SIM card slot should be displayed. The set of user settings may further comprise information indicating a display order of the information of the N SIM card slots being displayed such that the information of the N SIM card slots are displayed on the display unit of the device according to the display order of the N SIM card slots. The set of user settings may further comprise a set of predetermined rules configured for the M SIM card slots. In one embodiment, a same set of predetermined rules can be configured to all of the M SIM card slots. In other words, different SIM card slots may be configured with the same set of predetermined rules. In another embodiment, the set of predetermined rules are separately configured to each of the M SIM card slots. In other words, different SIM card slots may be configured with different set of predetermined rules. Referring to FIGS. 7A to 7B and 8A to 8B, which show some exemplary user interfaces for configuring the set of user settings according to the invention in which FIGS. 7A and 7B are exemplary user interfaces for configuring a same or unique set of predetermined rules for all of the M SIM card slots while FIGS. 8A and 8B are exemplary user interfaces for configuring a set of predetermined rules for each M SIM card slot. The user can configure the set of the predetermined rules, the display order and the set of user settings by suitable operations via the user interfaces shown in the FIGS. 7A to 7B and 8A and 8B. For example, the user may alter on or off of a rule to enable or disable the rule for all of the SIM card slots via the user interfaces 810 or 820 shown in the FIG. 7A or 7B or adjust the display order of the displayed SIM card slots via them. The user may also alter on or off of a rule to enable or disable the rule for each SIM card slot via the user interfaces 910 or 920 shown in the FIG. 8A or 8B or alter on or off of a SIM card slot to enable or disable the display of its information via them.

Figure 4:
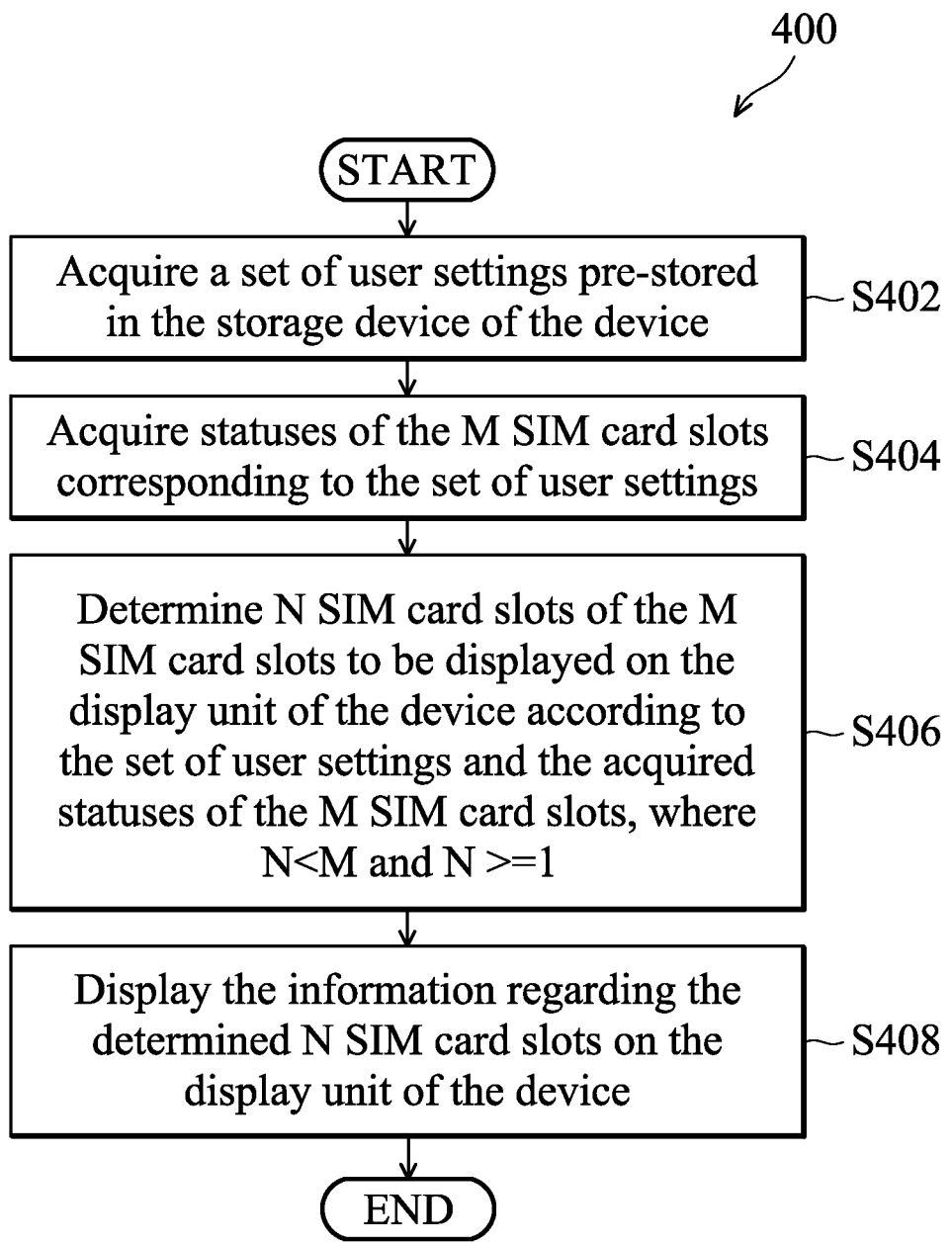
FIG. 4 is a flowchart showing another embodiment of a method for displaying SIM card slot information for use in a device according to the invention.

FIG. 4 is a flowchart 400 showing another embodiment of a method for displaying SIM card slot information for use in a device according to the invention. In this embodiment, the device (e.g. the device 100 of FIG. 1) includes M SIM card slots, each of which may have a SIM card inserted therein or no SIM card inserted therein. The user may have already configured the set of user settings for the M SIM card slots via the user interface (e.g. the user interface 810, 820, 910 or 920) and store them into the storage device 140 of the device.

In step S402, the processing unit 120 acquires a set of user settings pre-stored in the storage device 140 of the device 100. As previously described, the set of user settings may comprise information indicating which SIM card slot should be displayed, information indicating a display order of the information of the N SIM card slots being displayed and/or a set of predetermined rules configured for the M SIM card slots. In this embodiment, the set of predetermined rules can comprise one or more of aforementioned rules and the corresponding status of the M SIM card slots can comprise one or more of aforementioned statuses. Additionally, the set of predetermined rules can further comprise a rule of hiding information of a SIM card slot in which no SIM card is inserted and the corresponding status of a first SIM card slot can further comprise a status of whether a SIM card is inserted. The status of the first SIM card slot is indicated as no SIM card inserted if the no SIM card is inserted therein and it is indicated as inserted if a SIM card is inserted therein.

Then, in step S404, the processing unit 120 acquires statuses of the M SIM card slots corresponding to the set of user settings. After the statuses of all of the M SIM card slots are acquired, in step S406, the processing unit 120 determines N SIM card slots of the M SIM card slots to be displayed on the display unit 130 according to the set of user settings determined by the user and the acquired statuses of the M SIM card slots, where N<M and N>=1. For example, if M is 4, N can be 1, 2 or 3. After the N SIM card slots to be displayed are determined, in step S408, the display unit 130 displays the information regarding the determined N SIM card slots and displays them in order if a display order is configured in the set of user settings. In some embodiments, determination of the N SIM card slots of the M SIM card slots to be displayed on the display unit of the device according to the set of user settings and the acquired statuses of the M SIM card slots can be achieved by determining whether the status of a first SIM card slot of the M SIM card slots satisfies the set of predetermined rules included in the set of user settings. It is to be noted that the first SIM card slot used herein can be any of the M SIM card slots and thus the following steps can be applied to each of the M SIM card slots. The processing unit 120 may determine to display the information of the first SIM card slot when determining that the status of the first SIM card slot does not satisfy any of the set of predetermined rules and it may determine not to display the information of the SIM card slot when determining that the status of the first SIM card slot satisfies one of the set of predetermined rules. For example, the display unit 130 may display the information of the first SIM card slot in which the status thereof indicates that a SIM card is inserted when the set of predetermined rules only comprise hiding information of the SIM card slot in which no SIM card is inserted, display the information of the first SIM card slot in which the status thereof indicates that the inserted SIM card is valid when the set of predetermined rules only comprise hiding information of the SIM card slot in which the invalid SIM card is inserted, display the information of the first SIM card slot in which the status thereof indicates that the inserted SIM card is activated when the set of predetermined rules only comprise hiding information of the SIM card slot in which the inserted SIM card is deactivated, display the information of the first SIM card slot in which the status thereof indicates that the inserted SIM card is in service when the set of predetermined rules only comprise hiding information of the SIM card slot in which the inserted SIM card is in the no service status, and display the information of the first SIM card slot in which the status thereof indicates that the inserted SIM card is not in the roaming status when the set of predetermined rules only comprise hiding information of the SIM card slot in which the inserted SIM card is in the roaming status.

Figure 6B:
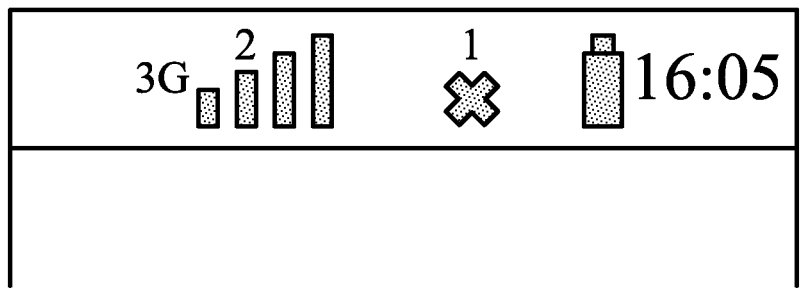

FIG. 6B shows another exemplary display of the information of the SIM card slots according to the invention. In this embodiment, it is assumed that the user configures the set of user settings to comprise a setting of displaying only the information of the SIM1 slot and SIM2 slot without further rules and a display order of from the SIM2 to the SIM1. For a device with four SIM card slots with four SIM cards SIM1, SIM2, SIM3 and SIM4 in which the acquired statuses for the four SIM card slots indicate that SIM1, SIM3 and SIM4 is no SIM card inserted, the information of the SIM2 and SIM1 will be displayed in order while the information of the SIM3 and SIM4 will not be displayed as shown in FIG. 6B. It is also observed from FIG. 6B that, as no further rules are configured to the SIM1 and SIM2, the information of the SIM1 is still displayed even if the status of which is no SIM card inserted. In other words, the information or the status of a SIM card slot in which no SIM card is inserted or the inserted SIM card is deactivated, in the roaming status or in the no service status may still be displayed if the set of user settings indicate to display the information of that SIM card slot.

In another embodiment, it is assumed that the user configures the set of user settings to comprise the following rules for all of the SIM card slots: hiding information of a SIM card slot in which the inserted SIM card is deactivated and hiding information of a SIM card slot in which the inserted SIM card is in a roaming status. For a device with four SIM card slots with four SIM cards SIM1, SIM2, SIM3 and SIM4 in which the acquired statuses for the four SIM card slots indicate that SIM1 is in use or valid, SIM2 is deactivated, SIM3 is not in the roaming status and SIM4 is in the roaming status, only the information of the SIM1 and SIM3 will be displayed while the information of the SIM2 and SIM4 will not be displayed as shown in FIG. 6A.

In some embodiments, when detecting that the statuses of the M SIM card slots has potentially changed (e.g. the status of the SIM card slot is changed from "no service status" to "in service status"), the device of the invention may re-determine the N SIM slots to be displayed and refresh or update the displayed information of the N SIM card slots on the display unit of the device based on currently acquired statuses of the M SIM card slots and the set of user settings.

Figure 5:
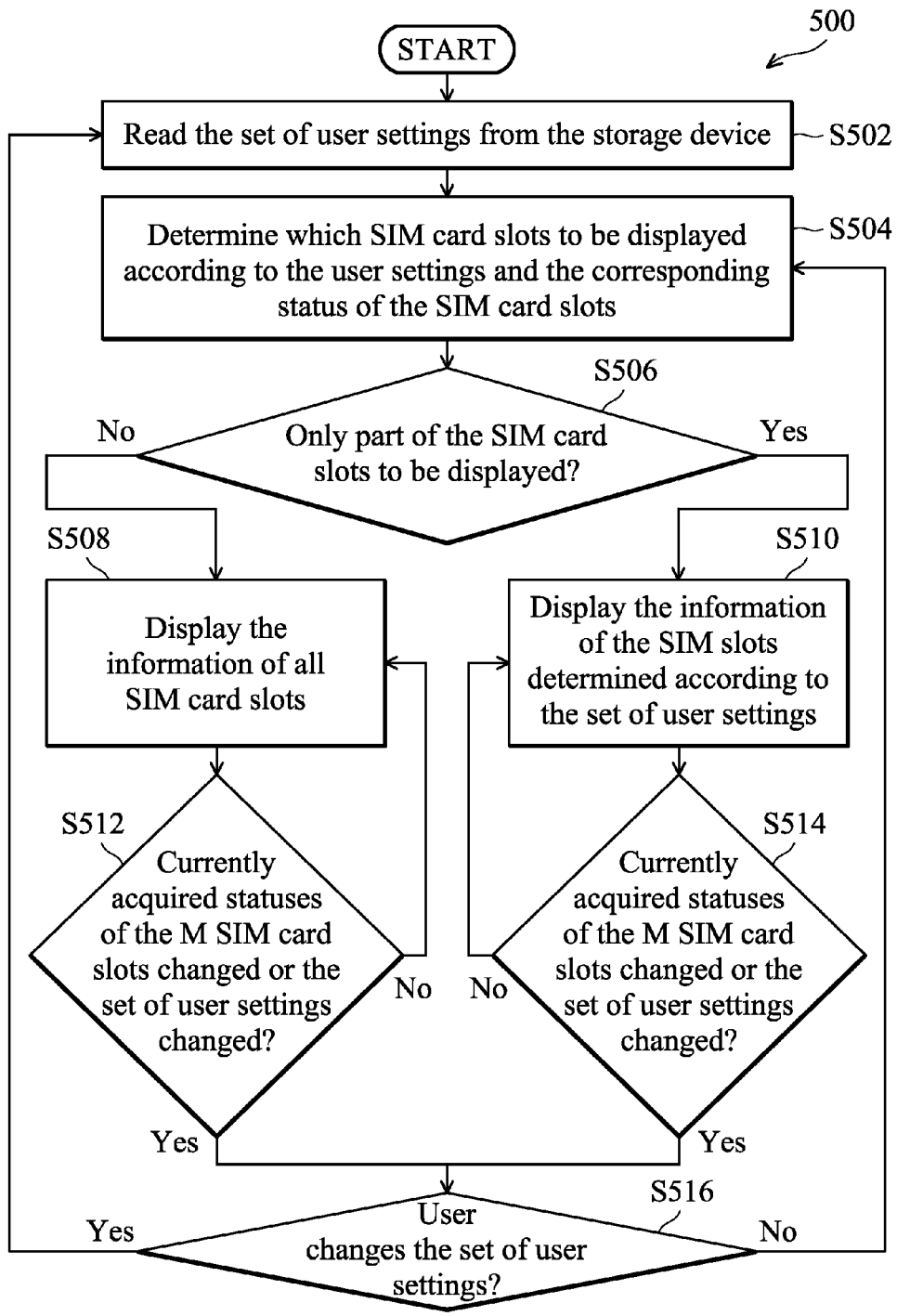
FIG. 5 is a flowchart showing another embodiment of a method for displaying SIM card slot information according to the invention.

FIG. 5 is a flowchart 500 showing another embodiment of a method for displaying SIM card slot information according to the invention. In this embodiment, the device (e.g. the device 100 of FIG. 1) includes M SIM card slots, each of which may have a SIM card inserted therein or no SIM card inserted therein. The user may have already configured the set of user settings for the M SIM card slots via the user interface (e.g. the user interface 810, 820, 910 or 920) and store them into the storage device 140 of the device.

In step S502, the processing unit 120 first reads the set of user settings from the storage device 140 (e.g. the memory unit) and then in step S504, determines N SIM card slots to be displayed according to the set of user settings and the corresponding status of the M SIM card slots. The set of user settings may comprise information indicating which SIM card slot should be displayed, information indicating a display order of the information of the N SIM card slots being displayed and/or a set of predetermined rules configured for the M SIM card slots. The set of predetermined rules can comprise one or more of aforementioned rules and the corresponding status of the M SIM card slots can comprise one or more of aforementioned statuses. Next, in step S506, the processing unit 120 further determines whether only part of the M SIM slots are to be displayed. If not, i.e. N=M, in step S508, the processing unit 120 displays the information of all of the M SIM slots on the display unit 130 and step S512 is further performed. Otherwise (Yes in step S506), i.e. N<M, in step S510, the processing unit 120 displays only the information of the determined N SIM slots on the display unit 130 and step S514 is further performed. In step S512 or step S514, the processing unit 120 further determines whether currently acquired statuses of the M SIM card slots have been changed or the set of user settings have been changed and if so, step S516 is further performed to determine whether the user has changed the set of user settings. Note that the user may manually change the set of user setting via the user interface at any time so that the processing unit 120 has to check whether the set of user settings has been changed by the user. If the user changes the set of user settings (Yes in step S516), the processing unit 120 returns to step S502 to read the new set of user settings from the storage device 140 and re-performs the steps 504-516 to re-determine the N SIM slots to be displayed so as to refresh or update the displayed information of the N SIM card slots on the display unit 130 based on currently acquired statuses of the M SIM card slots and the set of user settings if needed. If the user does not change the set of user settings (No in step S516), the processing unit 120 returns to step S504 to re-determine the N SIM slots to be displayed so as to refresh or update the displayed information of the N SIM card slots on the display unit 130 based on currently acquired statuses of the M SIM card slots and the set of user settings if needed.

The described embodiments for displaying multiple SIM card slots information, or certain aspects or portions thereof, may be practiced in logic circuits, or may take the form of a program codes (i.e., instructions) embodied in tangible media, such as floppy diskettes, CD-ROMS, hard drives, or any other machine-readable storage medium, wherein, when the program codes are loaded into and executed by a machine, such as a smart phone, a mobile phone, or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, the machine becomes an apparatus for practicing the invention. When implemented on a general-purpose processor (e.g. 120 of FIG. 1), the program codes combine with the processor to provide a unique apparatus that operate analogously to specific logic circuits.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A method for displaying subscriber identity module (SIM) information for use in a device including M SIMs, comprising:
   determining a set of predetermined rules;
   acquiring statuses of the M SIMs corresponding to the set of predetermined rules; and
   displaying information regarding N of the M SIMs on a display unit of the device according to the set of predetermined rules determined by the device and the acquired statuses of the M SIMs, where N<M and N>=1,
   wherein the step of displaying information regarding N of the M SIMs on the display unit of the device according to the set of predetermined rules and the acquired statuses of the M SIMs further comprises:
   determining whether the status of a first SIMs of the M SIMs satisfies the set of predetermined rules;
   determining to display the information of the first SIM when determining that the status of the first SIM does not satisfy any of the set of predetermined rules; and
   determining not to display the information of the first SIM when determining that the status of the first SIM satisfies one of the set of predetermined rules.

2. The method of claim 1, wherein the set of predetermined rules comprises at least one of the following rules:
   hiding information of a SIM which is an invalid SIM;
   hiding information of a SIM which is deactivated;
   hiding information of a SIM which is in a no service status; and
   hiding information of a SIM which is in a roaming status.

3. The method of claim 2, wherein the statuses of the M SIMs comprise information indicating at least one of the following statuses:
   whether the SIM is an invalid SIM;
   whether the SIM is deactivated;
   whether the SIM is in a no service status; and
   whether the SIM is in a roaming status.

4. The method of claim 3, wherein the step of displaying information regarding N of the M SIMs on the display unit of the device according to the set of predetermined rules and the acquired statuses of the M SIMs further comprises:
   displaying the information of the first SIM in which the status thereof indicates that the SIM is valid when the set of predetermined rules only comprise hiding information of the SIM which is an the invalid SIM;
   displaying the information of the first SIM in which the status thereof indicates that the SIM is activated when the set of predetermined rules only comprise hiding information of the SIM which is deactivated;
   displaying the information of the first SIM in which the status thereof indicates that the SIM is in service when the set of predetermined rules only comprise hiding information of the SIM which is in the no service status; and
   displaying the information of the first SIM in which the status thereof indicates that the SIM is not in the roaming status when the set of predetermined rules only comprise hiding information of the SIM which the inserted SIM card is in the roaming status.

5. The method of claim 4, further comprising:
detecting that currently acquired statuses of the M SIMs has potentially changed; and
redetermining the N SIMs to be displayed and updating the displayed information of N of the M SIMs on the display unit of the device based on the set of predetermined rules and the acquired statuses of the M SIMs.

6. The method of claim 1, wherein the information of each of the M SIMs at least comprises information indicating a strength of the signal received from the associated network.

7. A method for displaying SIM information for use in a device including M SIMs, comprising:
acquiring a set of user settings pre-stored in a storage device of the device;
acquiring statuses of the M SIMs corresponding to the set of user settings; and
displaying information regarding N of the M SIMs on a display unit of the device according to the set of user settings and the acquired statuses of the M SIMs, where N<M and N>=1,
wherein the step of displaying information regarding N of the M SIMs on the display unit of the device according to the set of user settings and the acquired statuses of the M SIMs further comprises:
determining whether the status of a first SIM of the M SIMs satisfies a set of predetermined rules included in the set of user settings;
determining to display the information of the first SIM when determining that the status of the first SIM does not satisfy any of the set of predetermined rules; and
determining not to display the information of the first SIM when determining that the status of the first SIM satisfies one of the set of predetermined rules.

8. The method of claim 7, wherein the set of user settings further comprises information indicating the N SIMs to be displayed and information indicating a display order of the information of the N SIMs being displayed, and the information of the N SIMs are displayed on the display unit of the device according to the display order of the N SIMs.

9. The method of claim 8, wherein the set of user settings further comprises the set of predetermined rules configured for the M SIMs.

10. The method of claim 9, wherein a same set of predetermined rules are configured to all of the M SIMs.

11. The method of claim 9, wherein the set of predetermined rules are separately configured to each of the M SIMs.

12. The method of claim 9, wherein a user interface is provided to configure the set of the predetermined rules, the display order and the set of user settings.

13. The method of claim 9, wherein the set of predetermined rules comprises at least one of the following rules:
hiding information of a SIM which is not added;
hiding information of a SIM which is an invalid SIM;
hiding information of a SIM which is deactivated;
hiding information of a SIM which is in a no service status; and
hiding information of a SIM which is in a roaming status.

14. The method of claim 13, wherein the statuses of the M SIMs comprise information indicating at least one of the following statuses:
whether the SIM is not added;
whether the SIM is an invalid SIM;
whether the SIM is deactivated;
whether the SIM is in a no service status; and
whether the SIM is in a roaming status.

15. The method of claim 14, wherein the step of displaying information regarding N of the M SIMs on the display unit of the device according to the set of user settings and the acquired statuses of the M SIMs further comprises:
displaying the information of the first SIM in which the status thereof indicates that a SIM is added when the set of predetermined rules only comprise hiding information of the SIM which is not added;
displaying the information of the first SIM in which the status thereof indicates that the inserted SIM is valid when the set of predetermined rules only comprise hiding information of the SIM which is an invalid SIM;
displaying the information of the first SIM in which the status thereof indicates that the SIM is activated when the set of predetermined rules only comprise hiding information of the SIM which is deactivated;
displaying the information of the first SIM in which the status thereof indicates that the SIM is in service when the set of predetermined rules only comprise hiding information of the SIM which is in the no service status; and
displaying the information of the first SIM in which the status thereof indicates that the SIM is not in the roaming status when the set of predetermined rules only comprise hiding information of the SIM which is in the roaming status.

16. The method of claim 15, further comprising:
detecting that currently acquired statuses of the M SIMs or the set of user settings have potentially been changed; and
redetermining the N SIMs to be displayed and updating the displayed information of N of the M SIMs on the display unit of the device based on the set of user settings and the acquired statuses of the M SIMs.

17. The method of claim 16, wherein the information of each of N of the M SIMs at least comprises information indicating a strength of the signal received from the associated network.

18. A device, comprising:
M SIMs; and
a processing unit, determining a set of predetermined rules, acquiring statuses of the M SIMs corresponding to the set of predetermined rules, and determining N SIMs of the M SIMs to be displayed according to the set of predetermined rules and the acquired statuses of the M SIMs, where N<M and N>=1; and
a display unit, displaying information regarding the determined N SIMs,
wherein the processing unit further determines whether the status of a first SIM of the M SIMs satisfies the set of predetermined rules, determines that the information of the first SIM is to be displayed on the display unit when determining that the status of the first SIM does not satisfy any of the set of predetermined rules and determines that the information of the first SIM is not to be displayed on the display unit when determining that the status of the first SIM satisfies one of the set of predetermined rules.

19. A device, comprising:
M SIMs;
a storage unit, storing a set of user settings;
a processing unit, acquiring the set of user settings pre-stored in the storage device, acquiring statuses of the M SIMs corresponding to the set of user settings, and determining N SIMs of the M SIMs to be displayed according to the set of user settings and the acquired statuses of the M SIMs, where N<M and N>=1; and a display unit, displaying information regarding the determined N SIMs according to the set of user settings, wherein the processing unit further determines whether the status of a first SIM of the M SIMs satisfies a set of predetermined rules included in the set of user settings, determines that the information of the first SIM is to be displayed on the display unit when determining that the status of the first SIM does not satisfy any of the set of predetermined rules and determines that the information of the first SIM is not to be displayed on the display unit when determining that the status of the first SIM satisfies one of the set of predetermined rules.

* * * * *